United States Patent Office 2,763,056
Patented Sept. 18, 1956

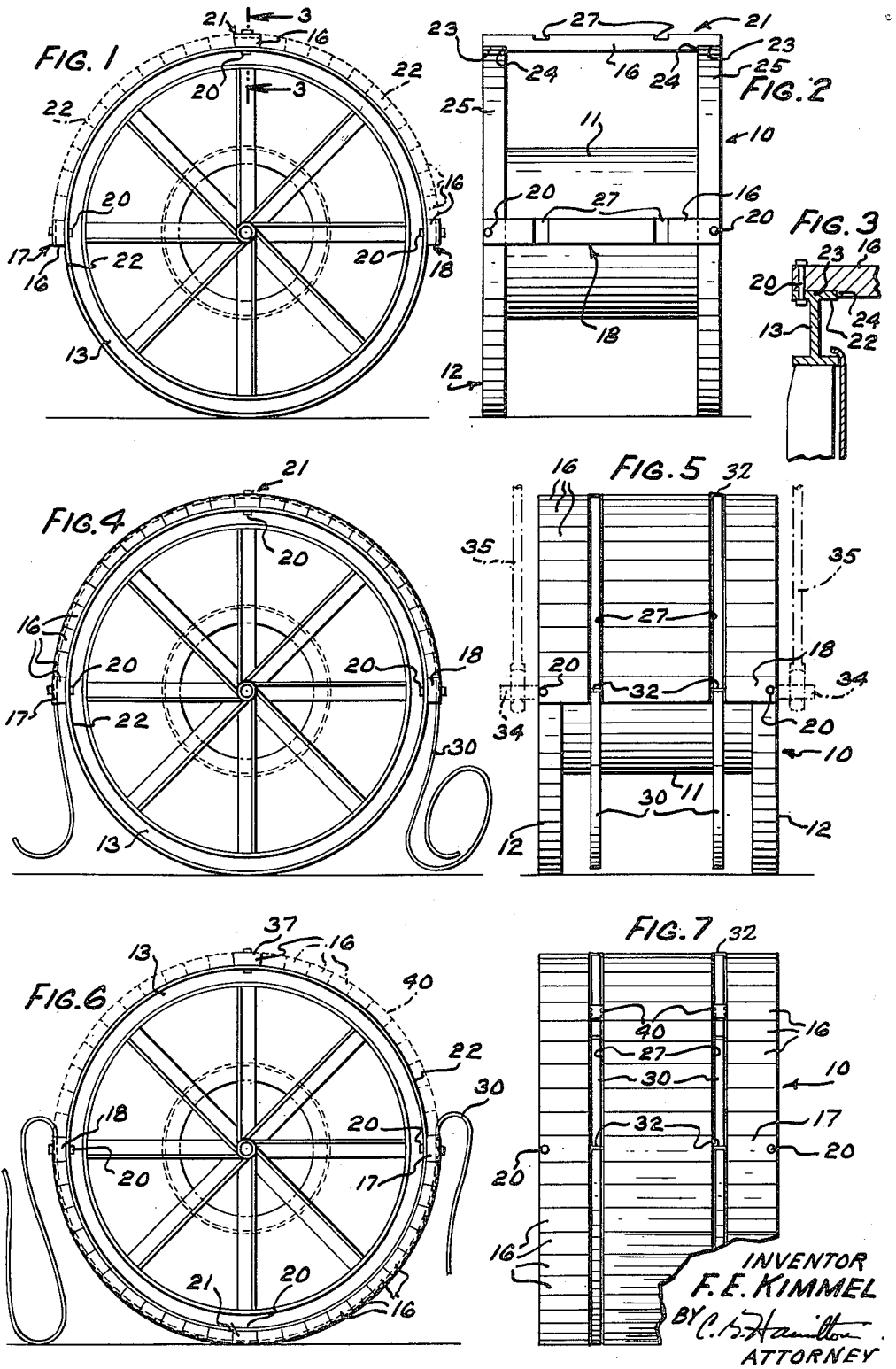

2,763,056

METHOD OF LAGGING REELS

Frank E. Kimmel, North Riverside, Ill., assignor to Western Electric Company, Incorporated, New York, N. Y., a corporation of New York Application May 4, 1955, Serial No. 506,040

5 Claims. (Cl. 29—452)

This invention relates to a method of lagging reels and more particularly to a method of applying lags to the outer periphery of relatively large reels.

An object of the invention is to provide a novel method of lagging reels.

Another object of the invention is to provide an efficient and effective method of applying lags accurately to the outer periphery of large reels.

A method illustrating certain features of the invention may include fastening a pair of lags to the heads of the reel in diametrically opposed relation to each other in horizontal alignment with the axis of the reel and fastening another lag to the heads of the reel above and in vertical alignment with the axis, placing a plurality of loose lags across the heads on the upper half thereof between the fastened lags, placing a pair of steel binding tapes around the lags positioned on the upper half of the reel, securing the tapes to the fastened lags with staples to retain the loose lags in position on the reel. The reel may then be rotated one half turn to position the unlagged portion of the reel uppermost, after which the method includes fastening another lag across the reel heads in vertical alignment with the axis thereof, placing a plurality of loose lags across the reel heads between the fastened lags to completely encircle the reel with lags, winding the end portions of the steel tapes about the remainder of the lags with the ends of the tapes in overlapping relation to each other, tightening the steel tapes to bind the loose lags to the reel, and securing the ends of the tapes to each other.

Other objects and advantages of the invention will become apparent by reference to the following detailed description and the accompanying drawings illustrating a preferred embodiment thereof, in which:

Fig. 1 is a side view of a reel showing three lags fastened to the outer periphery thereof and indicating in dotted lines a plurality of lags on the upper half of the reel between the fastened lags;

Fig. 2 is a front view of the reel and fastened lags shown in Fig. 1;

Fig. 3 is an enlarged fragmentary sectional view through the reel taken on line 3—3 of Fig. 1;

Fig. 4 is a side view of the reel showing the lags applied to the upper half thereof and a steel tape wound around the lagged portion thereof;

Fig. 5 is a front elevational view of the reel and lags shown in Fig. 4 and indicating in dotted lines means for raising the reel;

Fig. 6 is a side view of the reel with the lags and the tape partly assembled thereto as shown in Fig. 4 after the reel has been rotated one half turn and indicating in dotted and full lines the lagging on the upper half of the reel; and Fig. 7 is a front elevational view of the reel completely lagged.

The present method was devised for lagging large steel reels 10 of the type for supporting cable or other strand material thereon, which has been omitted from the drawings for the sake of clearness and simplicity of illustration. The reel comprises a drum 11 to the ends of which are secured composite reinforced reel heads 12 having rims 13 of "I" cross section (Fig. 3).

With the reel 10 supported on the floor or other horizontal supporting surface as shown in Figs. 1 and 2, a pair of lags 16 is placed across the heads 12 on opposite sides of the reel in horizontal alignment with the axis of the reel as shown at 17 and 18 in Fig. 1 and are suitably fastened to the heads. As shown in Fig. 3, the lags 16 are secured to the heads 12 by bolts 20, which extend through apertures in the ends of the lags and through apertures in the outer flanges 22 of the rim 13. If desired, a third lag may be placed across the reel heads 12 and fastened thereto in vertical alignment with the axis of the reel as indicated at 21 in Fig. 1. With the three lags secured to the reel head in parallel and 90° spaced relation to each other, loose lags 16 are applied across the upper portions of the reel heads to fill in the spaces between the fastened lags 17, 21, and 18 as indicated in dotted lines at 22.

The lags 16, which are made from rectangular sections of wood, have rabbeted ends forming flat surfaces 23 and shoulders 24, the former being engageable with the outer peripheral surfaces 25 of the rims 13 and the latter adapted to engage or be disposed in close proximity to the inwardly directed portions of the outer flanges 22 of the rim 13 to prevent longitudinal displacement of the lags when applied to the reel. A pair of transverse slots 27 are formed in the lags 16 for receiving steel binding tapes 30 therein. After the loose lags have been applied to the upper portion of the reel a pair of the steel binding tapes 30 are laid over the lags in the two aligned slots 27 thereof and the tapes are secured to the fastening lags 17, 21, and 18 by any suitable means such as by driving staples 32 into the lags, to retain the loose lags in position on the reel while the remainder of the reel is being lagged. The steel binding tapes 30 are cut to a predetermined length sufficient to encircle the lagged reel and with the end portions of the tapes overlapping to permit the application of a seal to secure them together.

The reel 10 with lags covering one half of the periphery thereof is then rotated 180° to position the unlagged portion of the reel uppermost as shown in Fig. 6. The rotation of the reel 10 may be accomplished by inserting an arbor or shaft 34 through a central aperture of the reel and engaging the ends thereof with hooks 35 of a hoist and raising the reel a distance sufficient to permit it to be rotated through one half turn, after which the reel is lowered to the floor as shown in Fig. 6. If desired, a lag 16 may then be bolted to the upper surface of the reel heads in vertical alignment with the axis and in 90° spaced relation to the fastened lags 17 and 18 as indicated at 37 (Fig. 6). Loose lags are then applied across the reel heads between the fastened lags 18, 21, and 17 to fill in the unlagged portions of the reel, after which the loose end portions of the binding tapes are wrapped around the remainder of the lags and the reel with the ends thereof in overlapping relation. The ends of each tape are inserted in a sealing tool which is actuated to tighten the tape around the reel and which is actuated to apply a seal 40 to the overlapping ends of the tape to tightly secure them together. With the ends of the binding tapes 30 secured together by the seals 40, the tapes 30 bind the loose lags 16 in assembled relation to the reel heads 12.

If desired, the staples 32 securing the tapes 30 to the fastened lags 17, 21, and 18 may be removed.

The reels may be lagged by fastening to the reel heads more or less than the four legs disclosed herein. For example, two lags may be fastened to opposite sides of the reel heads in horizontal alignment with the axis, loose lags placed across the other portion of the reel heads and held in place by tapes stapled to the fastened lags. The reel may then be rotated 180°, loose lags placed across the remainder of the reel heads, and the tapes wound therearound and sealed to bind the lags to the reel. Also it is not necessary that the entire upper half of the reels be lagged at one time since successive smaller arcuate sections thereof may be lagged, and the reel turned as required, in the manner disclosed herein, until the reel has been completely lagged.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A method of lagging reels which comprises supporting the reel with the axis thereof disposed in a substantially horizontal plane; fastening a plurality of lags across the upper portion of the reel heads in spaced relation to each other; applying loose lags across the upper portion of the reel heads between the fastened lags; placing binding tapes around the lags on the reel; securing the tapes to the fastened lags to hold the loose lags in position on the reel; intermittently turning the reel to position successive unlagged portions of the reel uppermost; and after each turning movement of the reel fastening a lag across the upper portion of the reel heads in spaced relation to another fastened lag thereon, applying loose lags across the upper portion of the reel head between the fastened lags, wrapping the tapes around the lags and securing them to the fastened lags until the reel is completely lagged and the tapes completely encircle the reel; tightening the tapes around the reel; and securing the ends of the tapes together.

2. A method of lagging reels which comprises supporting the reel with the axis thereof disposed in a substantially horizontal plane; bolting a plurality of lags to the outer periphery of the upper portion of the reel heads in predetermined spaced relation to each other and parallel to the reel axis; applying loose lags across the reel heads between the bolted lags; placing a plurality of binding tapes around the lags on the reel; stapling the tapes to the bolted lags to hold the loose lags in position on the reel; turning the reel to position an unlagged portion of the reel uppermost; repeating the steps of bolting additional lags to the unlagged portion of the reel in spaced relation to the other bolted lags; applying loose lags across the reel heads between the bolted lags, winding the tapes around the loose lags and stapling them to the bolted lags until the reel is completely lagged and the tapes are completely wound around the reel; then tightening the tapes around the reel, and securing the ends of each of the tapes together.

3. A method of lagging reels which comprises supporting the reel with the axis thereof disposed in a substantially horizontal plane; fastening a plurality of lags across the upper portion of the reel heads in a predetermined spaced relation to each other; applying loose lags across the reel heads to fill the space between the fastened lags; placing a binding tape around the lags on the reel after the space is filled; stapling the tape to the fastened lags to hold the loose lags in position on the reel; turning the reel to position an unlagged portion of the reel uppermost; repeating the steps of fastening additional spaced lags to the unlagged upper portion of the reel, applying loose lags across the reel heads to fill the space between the fastened lags, winding the tape around the newly placed loose lags and stapling it to the fastened lags, and intermittently turning the reel as the lagging progresses until the reel is completely lagged and the tape completely encircles the reel; securing the ends of the tape together; and removing the staples from the fastened lags.

4. A method of lagging reels which comprises supporting the reel with the axis thereof disposed in a substantially horizontal plane, fastening a pair of lags across the reel heads on opposite sides thereof in horizontal alignment with the axis of the reel, applying loose lags across the upper half of the reel heads between the fastened lags, placing a binding tape around the lags on the reel, securing the tape to the fastened lags to hold the loose lags in position on the reel, turning the reel through one half turn to dispose the unlagged portion of the reel uppermost, applying loose lags across the upper portion of the reel heads between the fastened lags, wrapping the tape around the remainder of the lags and the reel into overlapping relation with each other, tightening the tape to bind the loose lags tightly against the reel heads, and securing the ends of the tape against longitudinal movement relative to each other.

5. A method of lagging reels which comprises supporting the reel with the axis thereof disposed in a substantially horizontal plane, bolting a pair of lags to the reel heads on opposite sides thereof in horizontal alignment with the axis of the reel, applying loose lags across the upper half of the reel heads between the fastened lags, placing a plurality of binding tapes around the lags on the reel, stapling the tapes to the fastened lags to hold the loose lags in position on the reel, rotating the reel through one half turn to dispose the unlagged portion of the reel uppermost, applying loose lags across the upper portion of the reel heads between the bolted lags, wrapping the tapes around the remainder of the lags on the reel, tightening the tapes to bind the loose lags tightly against the reel heads, and securing the ends of each tape together.

No references cited.